United States Patent
Cheng et al.

(10) Patent No.: US 10,267,709 B2
(45) Date of Patent: Apr. 23, 2019

(54) OPTICAL SENSOR INTERROGATION SYSTEM A METHOD OF MANUFACTURING THE OPTICAL SENSOR INTERROGATION SYSTEM

(71) Applicant: Nederlandse Orgnisatie voor toegepast-natuurwetenschappelijk onderzoek TNO, Delft (NL)

(72) Inventors: Lun Kai Cheng, Delft (NL); Remco Alexander Nieuwland, Delft (NL); Peter Martijn Toet, Delft (NL); Michiel Peter Oderwald, Delft (NL)

(73) Assignee: NEDERLANDSE ORGANISATIE VOOR TOEGEPAST-NATUURWETEN-SCHAPPELIJK ONDERZOEK TNO, Delft (NL)

( * ) Notice: Subject to any disclaimer, the term of this patent is extended or adjusted under 35 U.S.C. 154(b) by 0 days.

(21) Appl. No.: 14/399,489

(22) PCT Filed: May 6, 2013

(86) PCT No.: PCT/NL2013/000024
§ 371 (c)(1),
(2) Date: Nov. 6, 2014

(87) PCT Pub. No.: WO2013/169098
PCT Pub. Date: Nov. 14, 2013

(65) Prior Publication Data
US 2015/0153247 A1 Jun. 4, 2015

(30) Foreign Application Priority Data
May 7, 2012 (EP) .................................. 12166964

(51) Int. Cl.
*G01M 11/00* (2006.01)
*G01D 5/353* (2006.01)
*G02B 7/00* (2006.01)

(52) U.S. Cl.
CPC ......... *G01M 11/30* (2013.01); *G01D 5/35335* (2013.01); *G02B 7/00* (2013.01); *Y10T 29/49002* (2015.01)

(58) Field of Classification Search
CPC .... G01M 11/30; G01M 11/088; G01M 11/33; G01M 11/335; G01M 3/229;
(Continued)

(56) References Cited

U.S. PATENT DOCUMENTS

| 3,732,017 A * | 5/1973 | Wolber | G01N 21/39 250/339.09 |
| 5,497,231 A | 3/1996 | Schmidt | |

(Continued)

FOREIGN PATENT DOCUMENTS

| CN | 201623363 | 11/2010 |
| EP | 1 239 272 A2 | 9/2002 |

(Continued)

OTHER PUBLICATIONS http://www.thefreedictionary.com/corresponding.*
(Continued)

*Primary Examiner* — Mohamed K Amara
(74) *Attorney, Agent, or Firm* — Knobbe, Martens, Olson & Bear, LLP

(57) ABSTRACT

An optical sensor interrogation system can have a light source arranged for emitting light; a first optical arrangement arranged for intercepting the light and to forward the light to an optical sensor and to receive light therefrom. The wavelength reference is adapted to provide a reference wavelength. The system can further have a second optical (Continued)

arrangement adapted to receive reflected light from the optical sensor, a lens system for transferring the light into a beam and a scanning assembly including a scanning unit and/or a diffractive optical element. The system can still further have a detector for receiving optical response from the scanning assembly and a data processing system. A method is used to manufacture an optical sensor interrogation system.

25 Claims, 7 Drawing Sheets

(58) Field of Classification Search
CPC .......... G01M 11/3163; G01M 99/002; G01M 3/3281; G01M 11/083; G01M 5/0091; G02B 7/00; G02B 7/02; G02B 26/0841; G02B 6/4246; G02B 6/0073; G02B 27/0994; G02B 6/0068; G02B 7/003; G01D 5/35335; G01D 11/245; G01D 5/35316; G01D 5/35303; Y10T 29/49002; G01N 21/17; G01L 1/246
USPC ................................................ 356/73.1, 452
See application file for complete search history.

(56) References Cited

U.S. PATENT DOCUMENTS

| | | | | |
|---|---|---|---|---|
| 5,784,158 A * | 7/1998 | Stanco | ...................... | G01J 3/02 356/326 |
| 5,892,582 A * | 4/1999 | Bao | .................... | G01D 5/35383 250/227.27 |
| 5,909,280 A * | 6/1999 | Zavracky | ............. | G02B 26/001 356/454 |
| 6,086,776 A * | 7/2000 | Maynard | .............. | G02B 6/4214 216/24 |
| 6,118,530 A * | 9/2000 | Bouevitch | ................ | G01J 3/28 356/308 |
| 6,573,489 B1 * | 6/2003 | Johnson | ............. | G01K 11/3206 250/227.14 |
| 6,775,076 B2 * | 8/2004 | Do | .......................... | G02B 6/32 359/819 |
| 6,816,516 B2 * | 11/2004 | Daiber | ............... | G02B 6/29395 372/102 |
| 7,796,673 B2 * | 9/2010 | Volodin | ............. | G02B 27/0944 372/99 |
| 9,347,878 B2 * | 5/2016 | Weidmann | ................ | G01J 3/42 |
| 9,389,174 B2 * | 7/2016 | Taverner | ............ | G01N 21/4788 |
| 2002/0172239 A1 * | 11/2002 | McDonald | ............ | G02B 5/281 372/20 |
| 2003/0174743 A1 * | 9/2003 | Cliche | .................. | H04B 10/572 372/20 |
| 2004/0057472 A1 * | 3/2004 | Takiguchi | ............. | B82Y 20/00 372/20 |
| 2004/0091001 A1 * | 5/2004 | Sochava | ............. | H01S 3/08036 372/20 |
| 2006/0076476 A1 * | 4/2006 | Thingbo | ............ | G01D 5/35316 250/227.23 |
| 2006/0193352 A1 * | 8/2006 | Chong | .................... | H01S 3/067 372/6 |
| 2006/0256329 A1 * | 11/2006 | Coppeta | .................... | G01J 3/02 356/301 |
| 2006/0280216 A1 * | 12/2006 | Jayaraman | ................ | G01J 3/02 372/50.121 |
| 2007/0159636 A1 * | 7/2007 | Jayaraman | ............. | G01N 21/39 356/451 |
| 2007/0164221 A1 * | 7/2007 | Russell | ..................... | G01J 3/02 250/339.07 |
| 2007/0279629 A1 * | 12/2007 | Grun | ......................... | G01J 3/28 356/318 |
| 2008/0296480 A1 | 12/2008 | Haber et al. | | |
| 2010/0085572 A1 * | 4/2010 | Hartog | ............... | G01D 5/35383 356/478 |
| 2011/0109898 A1 * | 5/2011 | Froggatt | ................ | G01B 11/18 356/73.1 |
| 2011/0211198 A1 * | 9/2011 | Koda | .................. | G01B 9/02004 356/499 |
| 2012/0033220 A1 * | 2/2012 | Kotidis | ................... | B82Y 20/00 356/445 |
| 2012/0113426 A1 * | 5/2012 | Rao | ........................ | G01J 3/4338 356/437 |
| 2012/0236395 A1 * | 9/2012 | Shuman | .................. | G01N 21/17 359/330 |
| 2013/0113629 A1 * | 5/2013 | Hartog | ............... | G01D 5/35303 340/853.2 |
| 2013/0195131 A1 * | 8/2013 | Taubman | .................. | H01S 5/14 372/32 |
| 2016/0033360 A1 * | 2/2016 | Taverner | ............ | G01D 5/35387 356/73.1 |

FOREIGN PATENT DOCUMENTS

| | | |
|---|---|---|
| EP | 1 239 272 A3 | 3/2004 |
| WO | 98/17969 A1 | 4/1998 |
| WO | 99/09370 A1 | 2/1999 |

OTHER PUBLICATIONS http://www.tuolima.com/optical-passive-series/optical-coupler/1-2x2-optical-coupler.html.*
https://www.thorlabs.com/tutorials.cfm?tabID=8a6fc3cd-bd60-44bb-81d6-2c77089054a0.*
https://www.fiberoptics4sale.com/blogs/archive-posts/95047750-optical-fiber-couplers.*
International Search Report dated Oct. 22, 2013 for PCT/NL2013/000024.
Chen et al. "Multiplexing of large-scale FBG arrays using a two-dimensional spectrometer", SPIE vol. 3330 (1999), p. 245-252.
Communication pursuant to Article 94(3) EPC dated Nov. 30, 2016 in European Application No. 13 726 606.0.

* cited by examiner

OPTICAL SENSOR INTERROGATION SYSTEM A METHOD OF MANUFACTURING THE OPTICAL SENSOR INTERROGATION SYSTEM

CROSS REFERENCE TO RELATED APPLICATIONS

This application is the U.S. National Phase of International Application No. PCT/NL2013/000024, filed May 6, 2013, designating the U.S. and published in English as WO 2013/169098 on Nov. 14, 2013 which claims the benefit of European Patent Application No. 12166964.2, filed May 7, 2012.

FIELD OF THE INVENTION

The present invention relates to an optical sensor interrogation system.

The invention further relates to method of manufacturing an optical sensor interrogation system for optical sensors e.g. fiber optic sensor, Fiber Bragg Grating sensor, and so on.

BACKGROUND OF THE INVENTION

An embodiment of a system arranged for an optical sensor measurement is known from US 2008/0296480. In the known system a swept optical source is used to determine the wavelength of a fiber optic sensor. For this purpose a variable scan rate swept optical source is used to determine the optical path length from an optical interrogator to the optical sensors, which are being measured. The known system uses a narrow-band scanning source.

The known system has the following disadvantages:

- a commercial potential of fiber optic sensor systems is currently limited by the high cost of the commercially available interrogators. These optical sensor interrogation systems comprise high quality costly components or require an extensive calibration or a combination of both;
- commercial interrogators are often limited in bandwidth to around 1000 Hz making it rather difficult to monitor dynamic sensor behavior;
- use of a narrow bandwidth sweeping filter or laser as a light source for the interrogation of fiber optic sensors, such as Fiber Bragg Grating based sensors is based on a relation between the scan time and wavelength. It will be appreciated that each of the scanning filter based systems is operable to correlate time to wavelength. Accordingly, one of the problems of using such a methodology is a wavelength shift for the fiber optic sensors remote from the interrogator. This is supported by Table 1 of US2008296480 presenting the wavelength dependent response of the fiber optic sensor as a function of the fiber distance from the interrogator and the frequency of the narrow bandwidth sweeping light source.
- high accuracy electronics is required to control the sweep to ensure a well-defined relation between time and the wavelength.

SUMMARY OF THE INVENTION

It is an object of the present invention to provide an arrangement and a method to enable measurement of a signal using optical sensor interrogator based on narrow bandwidth sweeping filter and processing of such signal by processing means, in order to determine the wavelength of the signal in a simple, efficient, and fast manner, with high accuracy.

To this end the optical sensor interrogation system according to an aspect of the invention comprises:

- a light source arranged for emitting broadband light;
- a first optical arrangement for intercepting said light and to forward the light to an optical sensor, to be interrogated, and to receive light therefrom;
- a reference adapted to provide a reference wavelength;
- a second optical arrangement adapted to receive reflected light from the optical sensor to be interrogated;
- a lens system to transfer the light from the second optical arrangement to a beam;
- a scanning assembly comprising a scanning unit and a diffractive optical element;
- a detector system including optical arrangement for receiving optical response from the scanning assembly (the response being e.g. a diffracted beam) for producing corresponding data.

It is found that the interrogation device and method according to the invention is not sensitive to any distance variation between the optical sensors and the interrogator, which is beneficial for deploying optical sensors in remote locations and not having to correct for the individual distance of each sensor with respect to the interrogator. The optical sensor, to be interrogated by the system, may e.g. be adapted to provide a wavelength dependent optical power.

According to a further embodiment, the second optical arrangement is also adapted to receive the reference wavelength, provided by the a reference, particularly in case the reference is configured to generate light having the reference wavelength.

According to a preferred embodiment, the scanning assembly includes a diffractive optical element and is configured to direct the beam at different angles of incidence onto the diffractive optical element. This can be achieved in various ways, as will be explained in embodiments described here-below.

According to a further embodiment, the system may include a data processing system/data processor, arranged to calculate the wavelength of the optical sensor using the data of the detector system. Such a data processor may be configured in various ways, as will be appreciated by the skilled person. Particularly, according to an example, the data processing system may make information regarding the a scanning assembly, for example the configuration of the diffractive optical element (such as a pitch of the element) in combination with well known diffraction conditions, e.g. the diffraction equation associating diffraction angles with wavelengths. Detector data that is provided by the detector system may provide wavelength dependent information regarding both the reference wavelength and a sensor wavelength of a sensor under interrogation, particularly periodic information wherein the periodicity is determined by the scanning of the scanning assembly. In such a case, the data processor may also a.g. make use of predetermined information regarding the reference, e.g. a predetermined reference wavelength, to correlate the data and determine the sensor wavelength.

It will be appreciated that in an embodiment of the interrogation system according to an aspect of the invention a fiber sensor may be used for the optical sensor to be interrogated. Accordingly, in the description below reference to a fiber optical sensor or an optical sensor may be made.

It will be appreciated that the fiber optic sensor is not limited to the intrinsic types of sensor of which the fiber is part of the sensing element but also include extrinsic types of sensor which use optical fiber to transport the light from the sensor to the proposed interrogator.

It will be further appreciated that the term 'light source' is not limited to having the same operational wavelength range as the sensor. The light source may have a different wavelength range. For example, in a fiber laser sensor, the fiber laser operates in a range around 1550 nm while it is illuminated with a light source at other wavelength, in general about 980 nm or about 1480 nm.

It will be still further appreciated that the term 'light source' is not limited to a separate device but can also be understood by the skilled person as light generated by the sensor itself.

Further advantageous embodiments of the invention are recited in the dependent claims. In particular, the scanning assembly may advantageously comprise a multi-facet rotating or vibrating mirror or a resonant scanner. The said rotating or vibrating mirror may be driven by a motor causing the mirror to rotate around its central axis. The mirror is rotating or vibrating with a constant speed or the resonant scanner is being tuned at a constant rate.

Accordingly, it is found that it is no longer required to know the exact angle of the rotating or scanning device (no angle measurement necessary) if the tuning speed is constant. This can be achieved by e.g. a rotating device of which the inertia will contribute to a constant rotating speed. In this way the read-out speed of the interrogator is adjustable, by changing the rotation speed. At lower speeds the sensing resolution/accuracy may be higher. For high frequency read-out the rotation speed may be set high.

Although use of Fiber Bragg Grating (FBG) based optical sensors may be preferred, the system is not limited to only this type of optical sensors or fiber optic sensors. In fact any spectral shape from either a fiber optic sensor or another optical source can be resolved.

An arrangement operable using FBG is known per se from WO 99/09370, which is used for monitoring applications. In such applications, physical parameters like strain, temperature, pressure and others, are measured by a fiber network, containing a plurality of optical FBG sensors distributed over the structure. FBG sensors are capable of precise and absolute measurement of physical parameters as mentioned above. A FBG sensor installed in a fiber-optic network, reflects light signals that 1.5 travel through the optical fiber, with a wavelength k that relates to the FBG periodicity A as given by grating equation [1]:k=2 nA [1], where k is the wavelength of the light reflected by the FBG sensor, n is the refractive index of the optical fiber, and A is the periodicity of the FBG sensor, respectively.

Physical parameters that can be measured with FBGs, are related to the reflected wavelength due to the coupling of the physical parameters to the refractive index or the periodicity of the grating.

In structure monitoring applications, measurement of one or more specific physical parameters derived from a signal of an optical sensor in the fiber, is performed at a plurality of locations in the structure (e.g., a fuselage of an aircraft). To identify the origin of signals, each optical sensor generates a signal with a wavelength, specific for that sensor in that location. Thus, each wavelength corresponds to a location in the network. The signal wavelengths are well separated by intervals. The intervals are large enough to prevent overlap of sensor signals, when the response of a sensor changes due to change in a physical parameter, measured at the location of the sensor.

The light beam reflected by the sensors on the fiber network thus comprises a plurality of signals with different wavelengths has to be analysed by e.g., spectrometric means.

In many optical applications like FBG sensor networks, the wavelength of incident light is measured by a spectrometric arrangement with the purpose to determine a physical parameter related to the wavelength.

The method of spectrometry to determine the wavelength of light originated by the optical sensor, is well known. Light, gathered from a source (e.g., an optical sensor), is projected on a grating. Due to the wave characteristics of the light and the periodicity of the grating, the light is diffracted by the grating in one or more orders with their own direction as related to the wavelength (s) of the light, the angle of incidence, and the periodicity of the grating. By measurement of the angle of the diffraction direction (s) in the spectrometer, the wavelength of the light is determined.

In spectrometers, as known in the art, the diffracted light is projected on a detector array (e.g., a linear or two-dimensional CCD system). In such an arrangement the position of the projected light on the detector is proportional to the wavelength of the light. The position of the projection is determined by fitting a mathematical model to the intensity data as measured by the detector's elements. The fitting procedure is needed here, since the spatial intensity distribution of the incident light beam that enters the spectrometer's slit is not uniform, because typically, the beam is focussed on the slit to collect as much optical power as possible. The spatial intensity profile of the projected light beam is usually described by a peak-shaped curve. To determine the centroid of the signal, a model describing the shape of the peak is fitted to the measured signal. Due to the non-linearity of the spatial intensity distribution, a useful fit can be accomplished only if a plurality of data points within the profile are measured. To obtain a reasonable accuracy with a resolution higher than the size of a detector element (a "pixel"), the spot projected on the detector array must cover a sufficiently large number of elements in the array, all of which must be sampled in the fitting procedure. Typically, a resolution of approximately $1/10$ pixel is possible on a range of 10 pixels.

For a measuring range, which is, for example, 50 times larger, the range on which the light beam is projected must be extended to 50 detector elements. Taking into account a cross-talk separation between signals of about 10 detector elements, in that case a range of more than 60 detector elements on the detector is needed for one signal.

Usually, in a spectrometric application, many wavelengths are to be measured simultaneously, which requires that the spectrometer provides a sufficient large detector array. When, for example, 32 signals must be measured simultaneously, the detector array needs approximately 2000 elements.

In WO99/09370 a number of fiber channels each comprising a plurality of signals with different wavelengths are monitored by spectrometric means using a two-dimensional detector array on which the spectra of each fiber channel are projected on elongated regions of the array.

As known to those skilled in the art, in a such FBG sensor network, measurement of wavelengths of optical signals must be carried out at a rate, sufficiently efficient with respect to the number of FBG sensors in the network and the requirements for the type of application e.g., monitoring a structure by the FBG sensor network. By consequence of the method of fitting the peak shapes, a disadvantage of the arrangement of WO 99/09370 to obtain sub-element accuracy is, the rate at which data can be collected and calculated, especially, when high sample rates are required. From the paper of S.

Chen et al., "Multiplexing of large-scale FBG arrays using a two-dimensional spectrometer", SPIE vol. 3330 (1999), p. 245-252, it can be found that with a projection of a signal from a light beam on a field of 7×7 detector elements a resolution of approximately 1/56 of an element can be accomplished.

Due to the large amount of detector elements in an array, in such systems the overall average sampling rate is in the order of 100 Hz.

In an embodiment of the optical sensor interrogating system according to a further aspect of the invention, the scanning unit can be a polygon mirror with multiple (n) facets, which will enable an increase in the interrogation frequency of the fiber optic sensors attached to the interrogator due to multiple scans for a single rotation, and which may suppress the noise due to variations in the rotation speed. Preferably, 8 facets are used. It will be appreciated that the mirror may be arranged to rotate about its central axis or to vibrate about its central axis.

In another embodiment of the invention a fixed mirror is added to allow measurement of both the +1 and −1 diffraction order of the grating.

Variations in the diffraction grating pitch (caused by e.g. temperature fluctuations) can be compensated by measuring the relative distance (in time) between the +1 and −1 order of the diffraction grating for each sensor. This feature is discussed in more detail with reference to FIGS. 2, 3.

Alternatively the changes in diffraction grating pitch that are caused by temperature fluctuations may also be solved by:
1) controlling the temperature of the grating to a fixed temperature. E.g. by a TEC controller.
2) Measurement of grating temperature and correcting for the known deviations.

In a still further embodiment of the invention the rotating mirror is replaced by the rotating grating. This embodiment diminishes the number of required optical components, contributing to the simplicity of the system. The placement of the grating on the rotating/scanning actuator also allows for the measurement of the +1 and −1 diffraction order of the grating for each FBG sensor response. By this variations in the diffraction grating pitch (caused by e.g. temperature fluctuations) can be compensated for by measuring the relative time difference between the +1 and −1 order of the diffraction grating for at least one or preferably each sensor.

An alternative form of FIG. 5 can be multiple diffractive optical elements as the polygon mirror FIG. 3). In this embodiment each facet of the polygon mirror will be incorporated with a diffractive optical element.

Another embodiment of the invention the scanning assembly comprises only a diffraction grating, see FIG. 3. This embodiment has an advantage that it diminishes the number of required optical components, contributing to the simplicity of the system.

The grating may be placed on the rotating/scanning actuator allowing for the measurement of the +1 and −1 diffraction order of the grating for each FBG sensor response. In this way variations in the diffraction grating pitch (which may be caused by e.g. temperature fluctuations) can be compensated for by measuring the relative time difference between the +1 and −1 order of the diffraction grating for at least one or preferably each sensor.

Alternatively, in FIG. 3 multiple diffractive optical elements, such as the polygon mirror, may be used. In this embodiment each facet of the polygon mirror may be incorporated with a diffractive optical element.

In a still further embodiment of the system according to the invention the wavelength reference comprises at least one optically stabilized laser. More details on this embodiment will be discussed with reference to FIG. 4.

In a still further embodiment of the system according to the invention the wavelength reference comprises a gas cell. This embodiment will be discussed in more detail with reference to FIG. 5.

In a still further embodiment of the system according to the invention, it comprises a plurality of signal analysis channels, each signal analysis channel comprising a dedicated optical fiber sensor. More details on this embodiment will be presented with reference to FIG. 6.

The method of manufacturing an optical sensor interrogator according to an aspect of the invention comprises the steps of:
providing a light source arranged for emitting light;
providing a first optical arrangement for intercepting said light and to forward the light to an optical fiber sensor and to receive light therefrom;
providing a reference adapted to provide a reference wavelength;
providing the optical sensor adapted to provide a wavelength dependent reflective response;
providing a second optical arrangement adapted to receive reflected light from the optical fiber sensor;
providing a lens system adapted to transfer the light from the second optical arrangement to a beam;
providing a scanning assembly comprising a scanning unit and/or a diffractive optical element;
providing a detector system comprising a further optical arrangement for receiving optical response from the scanning assembly for producing corresponding data.

These and other aspects of the invention will be discussed in more detail with reference to drawings, wherein like elements are presented by like reference signs. It will be appreciated that the drawings are provided for illustrative purposes and may not be used for limiting the scope of the appended claims.

DETAILED DESCRIPTION OF THE DRAWINGS

Figure 1:
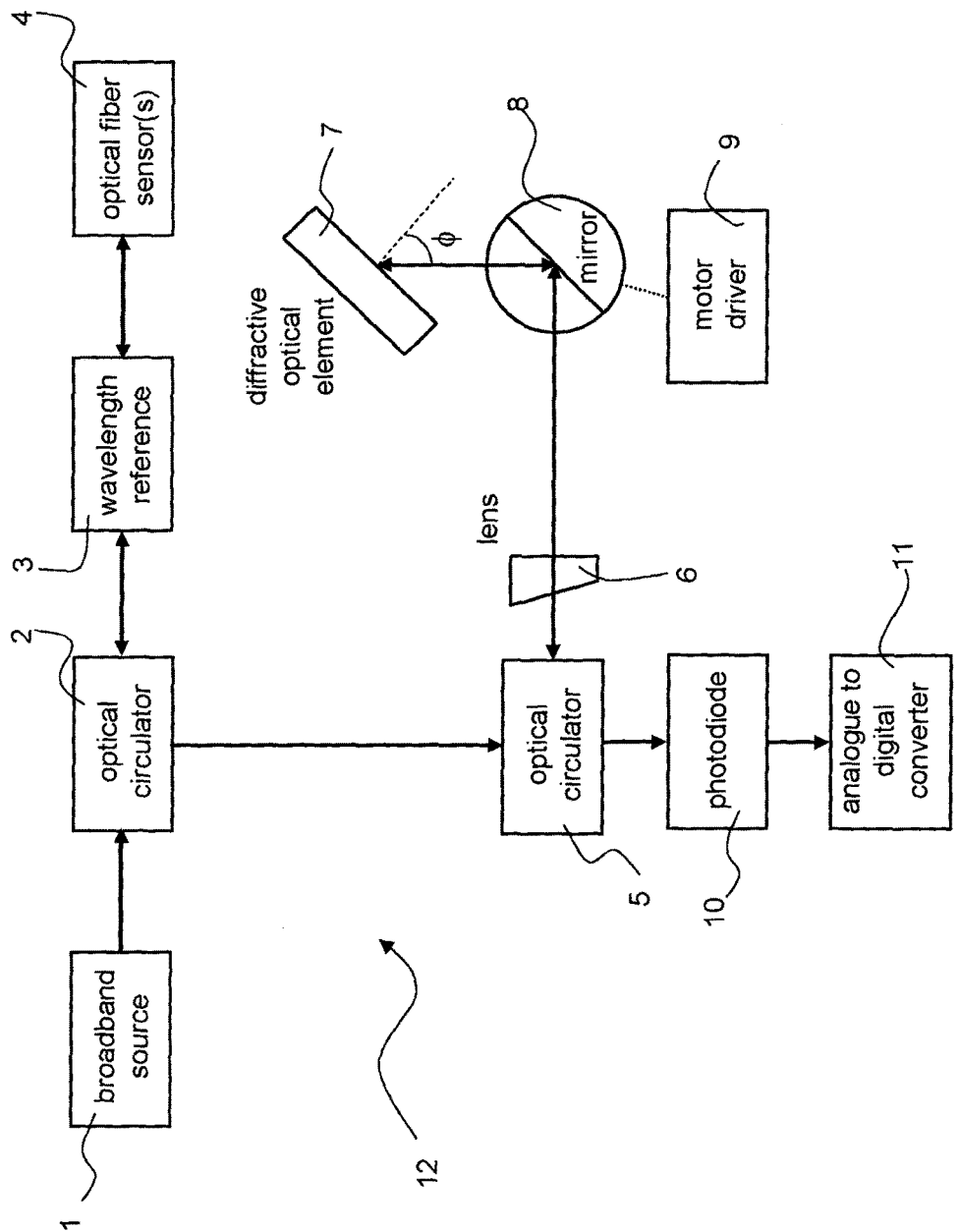
FIG. 1 presents in a schematic way an embodiment of an optical sensor interrogation system according to an aspect of the invention to interrogate optical fiber based sensor.

FIG. 1 presents in a schematic way an embodiment of an optical sensor interrogation system according to an aspect of the invention. The optical sensor interrogator system (12) comprises a light source (1), e.g. (but not limited to) a super luminescent diode (SLD), a source of amplified spontaneous emission (ASE) or super continuum source. Particularly, the source (1) is a broadband source transmitting light in a relatively broad wavelength band, contrary to a narrow-band tunable light source Also, preferably, a said broad wavelength band may include the one or more reference wavelenths $\lambda_{ref1}$, $\lambda_{ref2}$ and sensor wavelength $\lambda s$, mentioned here-below, at the same time.

The light source (1) is preferably fiber coupled to a beam splitting device (2) (e.g. a fiber optic coupler or an optical circulator). It will be appreciated that the principle of operation of abeam splitting device is known per se in the art.

Accordingly, light (e.g. broadband light emanating from the light source (1)) travels from the splitting device (2) to a wavelength reference (3) and one or more optical fiber sensors (4). In the example, light may travel from the splitting device (2) via the wavelength reference (3) to the one or more optical fiber sensors (4).

In the present example, the wavelength reference (which can also be called a "reference wavelength provider") is configured to generate reference light having at least one reference wavelength (for example a first reference wavelength $\lambda_{ref1}$ provided by a first part of the reference wavelength provided, e.g. a first FBG, and optionally a second reference wavelength $\lambda_{ref2}$ provided by an optional second reference wavelength provided, e.g. a second FBG, wherein the second reference wavelength $\lambda_{ref2}$ and first reference wavelength $\lambda_{ref1}$ are different wavelengths). In the example, the reference wavelengths correspond with associated parameters, including associated angles of incidence $\phi_1$, $\phi_2$, associated reference mirror angles $\phi m_1$, $\phi m_2$ and associated reference times $t_1$, $t_2$.

Returning to FIG. 1, in a further one embodiment of the invention the wavelength reference includes at least one Fiber Bragg Grating (FBG), and preferably two Fiber Bragg Gratings.

As will be appreciated by the skilled person, Fiber Bragg Grating sensors are configured to reflect incoming light having a particular wavelength (the so called Bragg wavelength). Thus, the present one or two Fiber Bragg Gratings may provide one or two reference Bragg wavelengths, i.e. reflect incoming light having such wavelength(s), the reflected light being reference wavelength light.

In order to maintain wavelength shift stability the wavelength reference (3) may be enclosed in an a-thermal package or in other means stabilizing the wavelength. The optical fiber sensors (4) are preferably, but not limited to, the Fiber Bragg Grating sensors.

The system (12) is operable using a wavelength dependant reflective response of the sensors (4).

Particularly, a said reference wavelength $\lambda_{ref1}$, $\lambda_{ref2}$ is not the same as the sensor wavelength $\lambda s$. For example, different Fiber Bragg Gratings may be used (providing different Bragg wavelengths) in the said reference wavelength provider 3 and the sensor(s) 4.

The light, reflected from the one or more sensors (4), travels towards a scanning assembly (7, 8), wherein the light is collimated before being received the scanning assembly. The scanning assembly particularly includes a diffractive optical element (8) and is configured to direct the beam at different angles of incidence onto the diffractive optical element. In the first embodiment, the scanning assembly e.g. includes a motor driven mirror (8) and a (stationary) diffractive optical element (7). As an alternative, e.g., the scanning assembly may include a motor driven diffractive optical element 32 (see FIG. 3).

In the example of FIG. 1, the light, reflected by the sensor under interrogation, travels again via the via the wavelength reference (3)) through the first beam splitting (2) device towards the second beam splitting device (5) and is preferably collimated by a lens (6). A resulting emerging free space collimated beam is reflected by said mirror (8) which is either continuously rotating or rotatively vibrating around its central axis, e.g. a polygon mirror with multiple facets or is continuously scanning a defined angle range, e.g. a resonant scanner. The mirror may be electrically driven by a motor driver (9). The light is reflected from the mirror (8) towards a diffractive optical element (7) which is set under the angle 4) (with respect to incoming light).

In the example, the diffractive optical element (7) is a reflection diffraction grating, in which incident and diffracted rays lie on the same side of the grating. Preferably angle $\phi$ is selected from the Littrow configuration to maximize the reflection efficiency. In the preferred embodiment of the invention the angle $\phi$ is about 68.4° for the centre of the C-band (i.e. 1530 to 1570 nanometer). The diffractive optical element (7) may e.g. comprise 1200 lines per millimeter.

It will be appreciated that the system (12) may be operable with another wavelength regions and other line spacing of the diffractive optical element.

The (Littrow) angle $\phi$ for both the wavelength reference (3) and optical fiber sensors (4) must be different, whereby both angles are addressed by the suitable rotation of the mirror (8). Once the angle $\phi$ of either the wavelength reference (3) or the optical fiber sensors (4) matches the well-known grating equation $m*\lambda=2*d*\sin \phi$ (i.e. in the Littrow configuration), the light will be reflected from the diffractive optical element (7) towards the mirror (8) and back in to the beam circulator (5) after focusing by the lens (6). In said grating equitation, $\lambda$ is the wavelength of the light, $\phi$ is the angle of incidence and reflection (see FIG. 1), m is the diffraction order (or spectral order), which is an integer, and d is the pitch (e.g. a diffraction grating groove spacing) of the diffraction grating, as will be clear to the skilled person.

It should be observed that said reflections of light at the reference wavelengths $\lambda_{ref1}$, $\lambda_{ref2}$ by the grating at certain reference angles of incidence $\phi_1$, $\phi_2$ will occur at respective rotating mirror reference angles $\phi m_1$, $\phi m_2$, at respective reference times $t_1$, $t_2$. Thus, as an example, a said rotating mirror reference angle $\phi m_1$, $\phi m_2$ is directly correlated with a respective reference wavelength $\lambda_{ref1}$, $\lambda_{ref2}$ and may even be used instead of that reference wavelength (i.e. as an indirect reference wavelength) reference in a dataprocessing to calculate a sensor wavelength $\lambda s$ (provided that the mirror angle versus time is detected, and the orientation of the diffractive optical element 7 with respect to the mirror is known).

A photodiode (10) detects the light (that has been reflected from the diffractive optical element (7) back towards the mirror (8), back in to the beam circulator (5) after the focusing by the lens (6)) and converts the light (optical signals) into the electrical domain after which data may be processed by an analogue to digital converter (11). Particularly, the analogue to digital converter (11) may generate a digital signal from an electrical signal (V), received from the photodiode (1), which digital signal can be processed by a signal or data processor (e.g. a computer).

The optical sensor interrogation system (12), particularly a said signal or data processor thereof, is configured to convert the wavelength information of the optical fiber sensor (4) to the time domain (see FIG. 7) by using the wavelength reference to interrelate the wavelength domain to the time domain, provided the angle of the mirror (8) as a function of time is known or can be determined from the photodiode signal, e.g. as a results of the combination of a constant rotation speed and the wavelength reference, or is measured, e.g. using an encoder.

Preferably, the angular speed of the rotating mirror is constant; in that case, the angle of the mirror (8) as a function of time can be simply correlated to the wavelength information of the photodiode signal using the known reference wavelength(s) and the above-mentioned grating equation. Alternatively, the angle of the mirror as a function of time is detected/measured by a suitable detector. In the preferred embodiment of the system (12) the wavelength bandwidth of the detection system is smaller than that of the optical fiber sensors. In addition, two stabilized Fiber Bragg Gratings may be used in/as reference wavelength provider (3) to account, for example, for variations in the angular rotation speed of the mirror.

Figure 7:
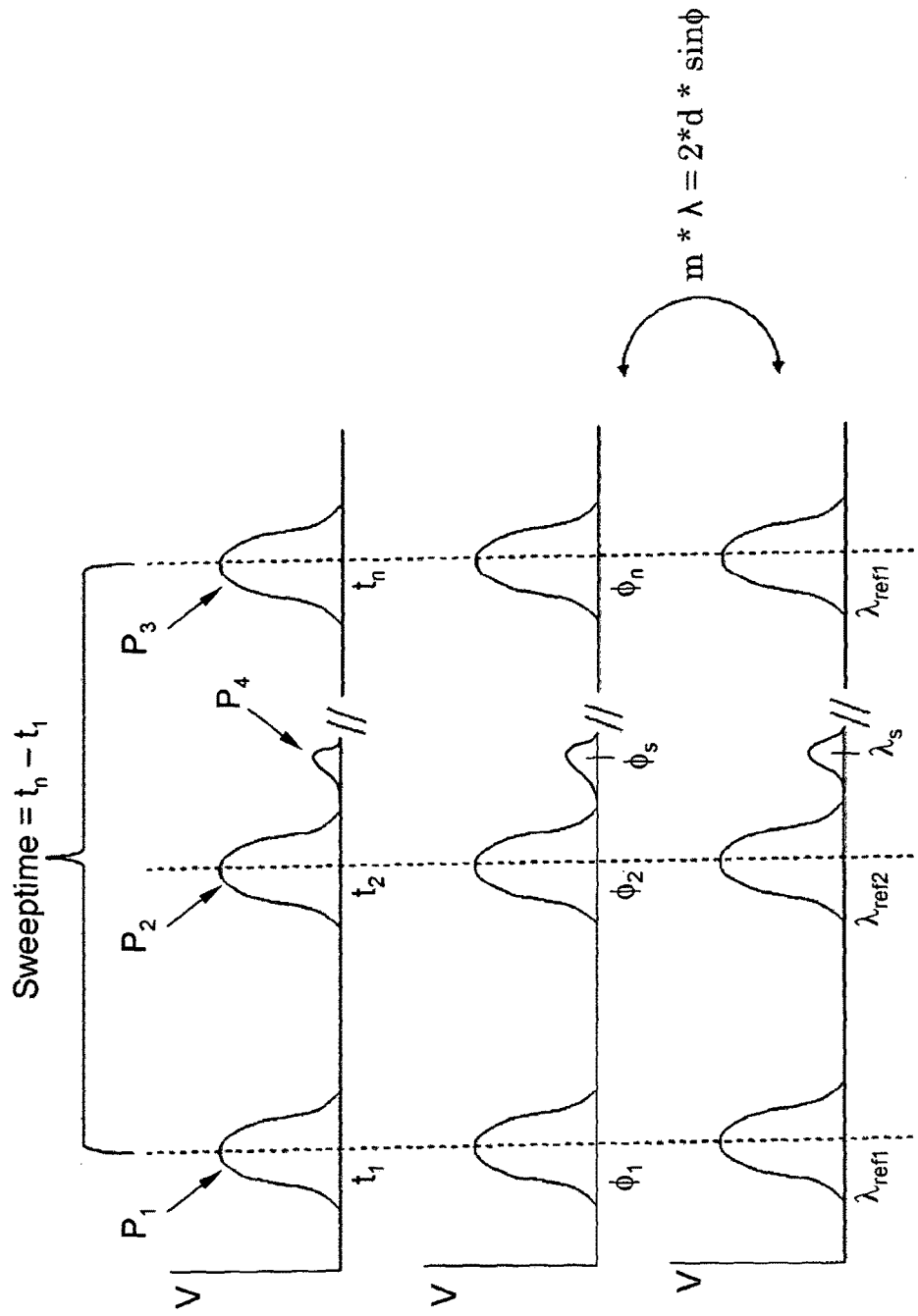
FIG. 7 shows three graphs representing the correlation of photodiode signal versus time, angle and wavelength.

An example of the above-mentioned conversion is shown in FIG. 7, depicting (from top to bottom) a first graph of photodiode signal (V) versus time (t), a second graph of the photodiode signal (V) versus mirror (8) angle, and a third graph of the photodiode signal (V) with the corresponding wavelength.

In the exemplary signal (V), various peaks P1-P4 are shown, namely a first peak P1 relating to a reflection of the light of the first reference wavelength $\lambda_{ref1}$ by the diffractive optical element (7) at a first reference time $t_1$. A second peak P2 at a second reference time $t_2$ may relate e.g. to a reflection of light of the second reference wavelength $\lambda_{ref2}$. A third peak P3 at time $t_n$ relates to a second reflection of the light of the first reference wavelength $\lambda_{ref1}$. A sweeptime $t_n$-$t_1$ indicated, the sweeptime e.g. being a scanning period or rotation period of the diffractive optical element (7).

It follows that a said signal/dataprocessor of optical sensor interrogator system (12) can be configured to detect the reference peaks (P1, P2, P3) in the photodiode signal (V), and correlate those peaks to the mirror angles (including the afore-mentioned reference angles $\phi_1$, $\phi_2$ of incidence, depicted in FIG. 7). In such a correlation, e.g., predetermined reference wavelengths $\lambda_{ref1}$, $\lambda_{ref2}$ may be used (or corresponding mirror angles of the rotating mirror), as well as the aforementioned grating equation.

Further, the processor can be configured to detect a sensor (4) related peak P4 in the photodiode signal (V), use the earlier correlation to determine the corresponding angle $\phi_a$ of incidence, and use the afore-mentioned grating equation to calculate the wavelength corresponding to that corresponding angle $\phi_s$. The resulting wavelength is the sensor wavelength $\lambda$s.

In an alternative embodiment, the system can be provided with a reference adapted to provide a reference wavelength, based on the angle of the rotating mirror (8). For example, the angle of the mirror (8) can be detected by a suitable angle detector (not shown), e.g. an encoder or a different detector, particularly to determine afore-mentioned rotating mirror reference angles $\phi m_1$, $\phi m_2$, at respective reference times $t_1$, $t_2$. Based on this information, the associated reference angles $\phi_1$, $\phi_2$ can be calculated using a predetermined orientation of the diffractive optical element (7) with respect to the mirror 8 (see FIG. 1)

It should be observed that correlating the sensor signal (time measurement) to angles of incidence can be achieved in various ways, e.g. as in the above-described manner or differently, as will be appreciated by the skilled person. Particularly, associating time to angle using a reference can be achieved via a reference in wavelength, or e.g. with a reference concerning the angle of the rotating light reflecting component (the rotating mirror, in FIG. 1). In the latter case, using the diffraction equation, the respective angle can be calculated. Even an angle $\phi$=0 can be used as a reference.

Figure 2:
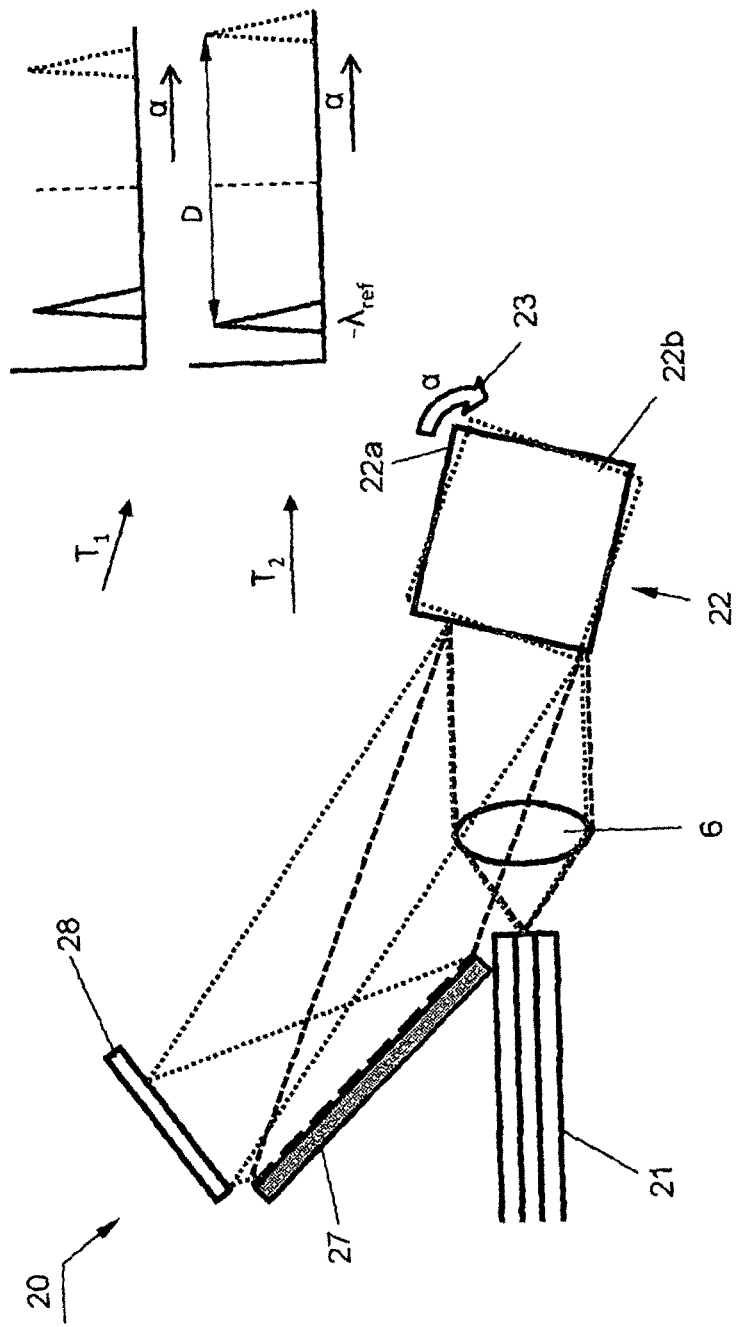
FIG. 2 presents in a schematic way a further embodiment of an optical sensor interrogation system according to an aspect of the invention.

FIG. 2 presents in a schematic way a further embodiment of part of a fiber optic sensor interrogation system (20) according to an aspect of the invention, particularly a part at a scanning assembly that includes a rotating mirror 22.

In this example, the system further comprises the motor driven mirror 22 (similar to the mirror (8) shown in FIG. 1) which can either be continuously rotating or rotatively vibrating, the mirror 22 being provided after the focusing lens (6) collimating the light from a fiber 21 (the light emanating from a said optical circulator (5)). The mirror 22 is rotated at least from a first position 22a to a second position 22b, as is schematically indicated by the arrow 23, to compensate for the shift in a reflection pattern from the grating 27 and the mirror 28.

In this embodiment a fixed mirror 28 is added to allow measurement of both the +1 and −1 diffraction order of the grating. Particularly, as follows from the drawing, the fixed mirror 28 is arranged/oriented such that the mirror 28 can receive light that is reflected by the rotating grating 27 at an angle $\phi$ away from the rotating mirror 22, and to reflect that light back towards the rotating mirror 22.

As a result, both +1 and −1 order light reflections can be returned to the optical circulator (5), to be detected by the photodiode (10) and processed by the signal processor of the system.

Preferably, the system is configured to compensate for variations in the diffraction grating pitch of the diffraction grating 7 (e.g. variations be caused by temperature fluctuations of the grating). To this aim, preferably, the system is configured to detect both +1 and −1 order reflections of the diffraction grating.

Figure 3:
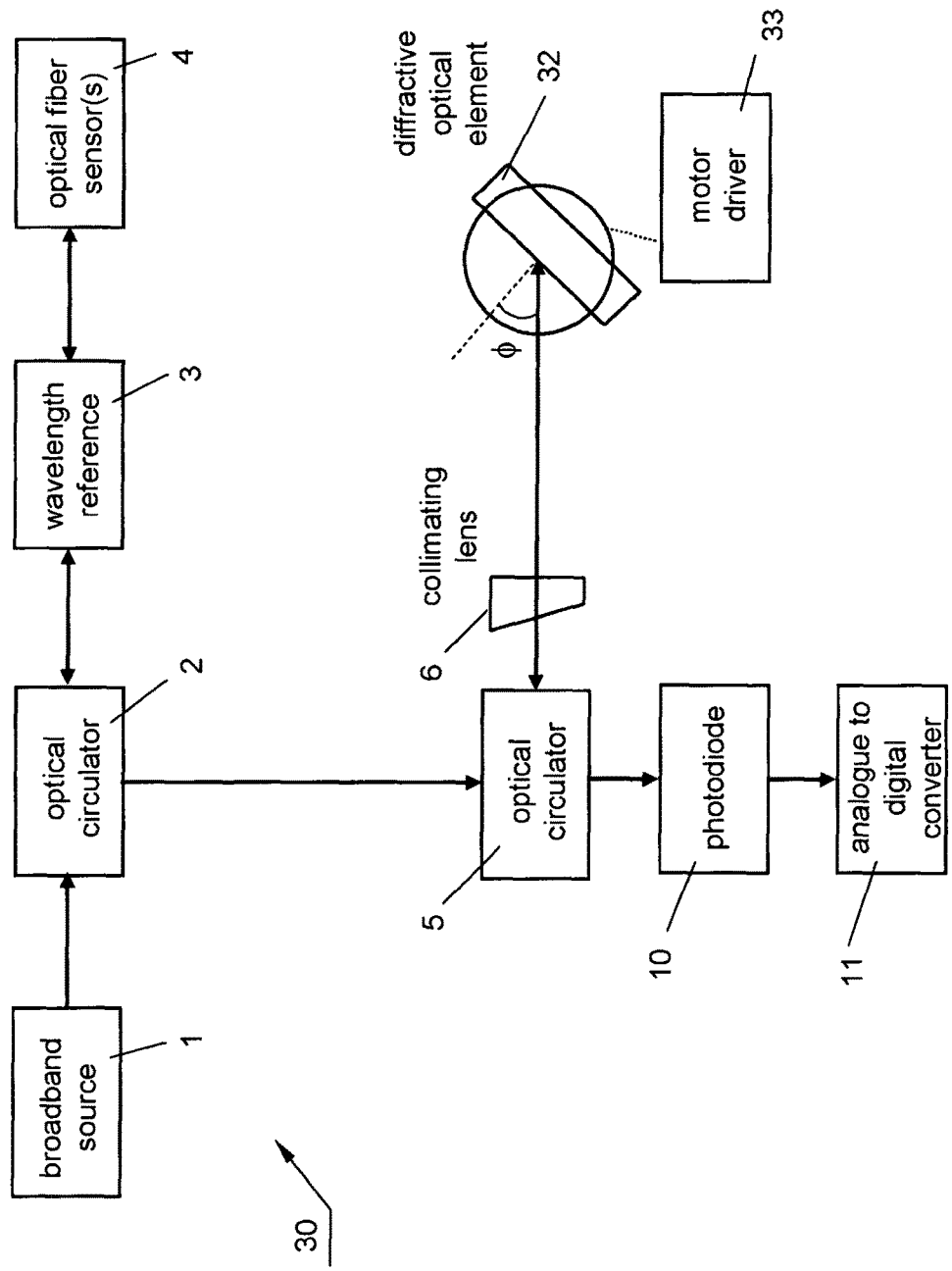
FIG. 3 presents in a schematic way a still further embodiment of an optical sensor interrogation system according to an aspect of the invention.

FIG. 3 presents in a schematic way a still further embodiment of a fiber optic sensor interrogation system according to an aspect of the invention. This particular embodiment of the system (30) differs from the example shown in which the rotating mirror is replaced by a rotating diffraction grating 32. The rotating diffraction grating may be driven by a suitable motor 33. This embodiment has an advantage that it diminishes the number of required optical components, contributing to the simplicity of the system. The placement of the grating on the rotating/scanning actuator also allows for the individual measurement of the +1 and −1 diffraction order of the grating for each FBG sensor response. By this variations in the diffraction grating pitch (caused by e.g. temperature fluctuations) can be compensated for e.g. by measuring the relative time difference between the +1 and −1 order of the diffraction grating for at least one or preferably each sensor, and by comparing a measured time difference with a predetermined time difference relating to an initial grating temperature $T_1$. From such a comparison, the processor can determine e.g. a grating temperature compensation factor that can be applied to a determined sensor wavelength $\lambda_s$ to calculate a compensated sensor wavelength For example, to carry out compensation, the signal processor may be provided (e.g. in a memory thereon with information regarding a predetermined distance between a +1 and −1 order reflection of the light having a said reference wavelength $\lambda_{refl}$, for example a +1 −1 order distance when the grating is at a predetermined initial temperature $T_1$ (e.g. room temperature, e.g. 20° C.). This distance will change when the grating is at a different temperature $T_2$ (see FIG. 2). The information regarding the predetermined distance between a +1 and −1 order may e.g. be a respective difference in time, or e.g. a corresponding difference in angle $\phi$ or a corresponding difference in wavelength or different corresponding information.

An alternative embodiment of the system (30) it may comprise a suitable plurality of diffractive optical elements cooperating with, for example, a multi-facet mirror. In this case facet of the polygon mirror may be provided with a diffractive optical element. Preferably, an 8-facet mirror is used.

Figure 4:
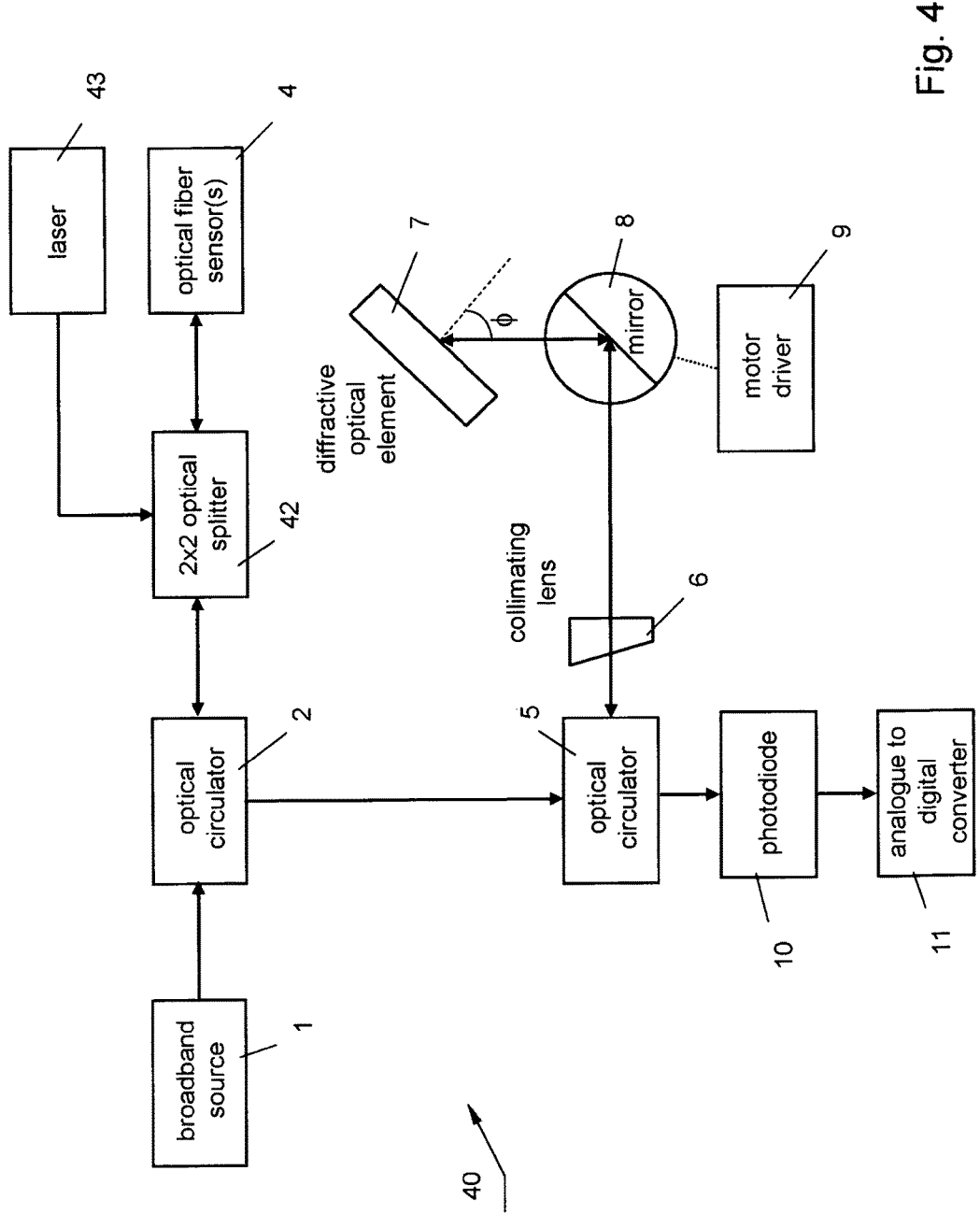
FIG. 4 presents in a schematic way a still further embodiment of an optical sensor interrogation system according to an aspect of the invention.

FIG. 4 presents in a schematic way a still further embodiment of a fiber optic sensor interrogation system according to an aspect of the invention. In this particular embodiment, the system (40) according to an aspect of the invention comprises one or multiple stable lasers (43) as the wavelength reference. In order to incorporate the laser in the system (40) a 2×2 optical splitter (42) or a suitable coupler (not shown) may be used.

This embodiment has an advantage that the laser light is stable with respect to the wavelength shift.

Figure 5:
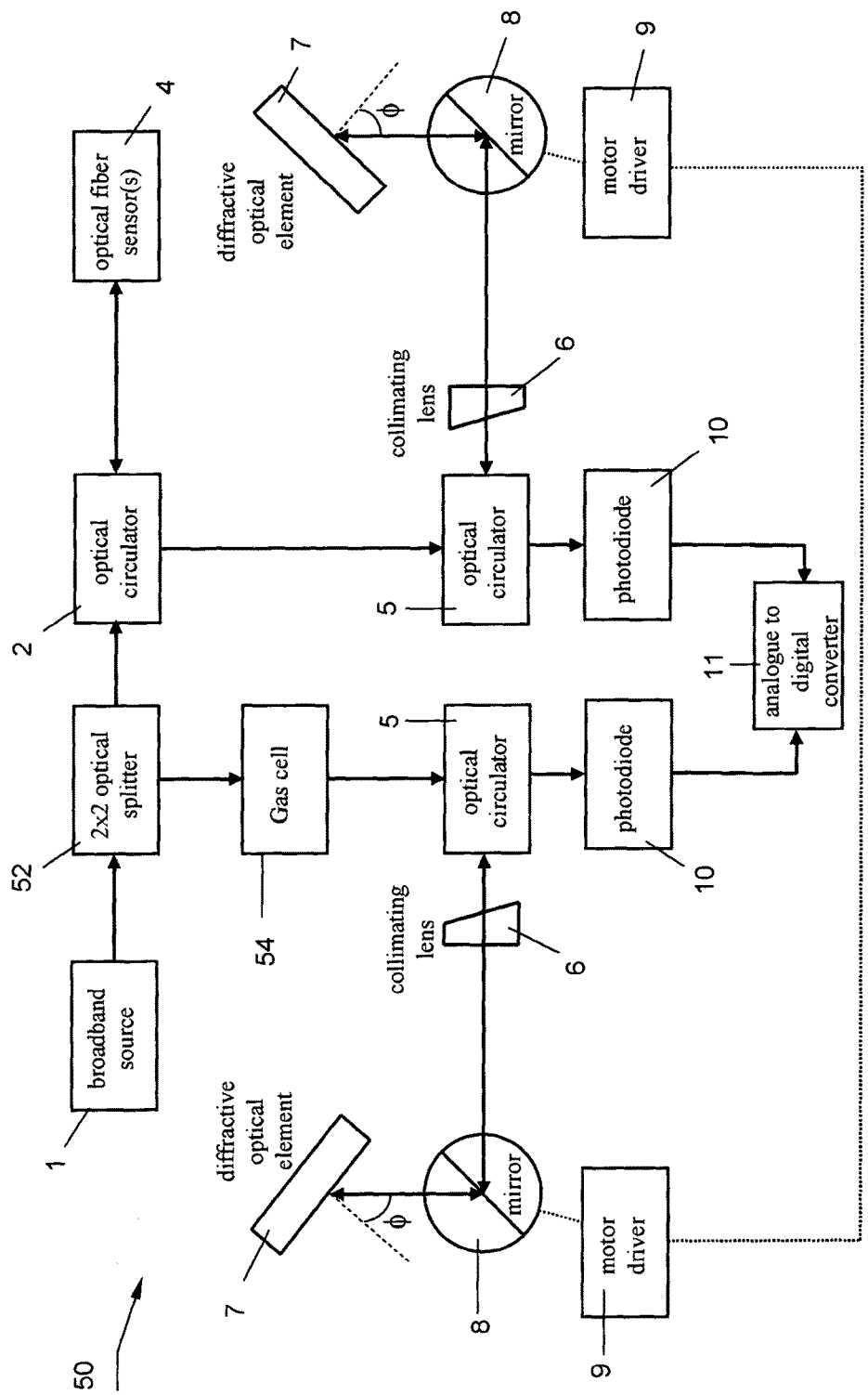
FIG. 5 presents in a schematic way a still further embodiment of an optical sensor interrogation system according to an aspect of the invention.

FIG. 5 presents in a schematic way a still further embodiment of a fiber optic sensor interrogation system according to an aspect of the invention. In this particular embodiment the system (50) comprises a gas cell (54) as a wavelength reference. It will be appreciated that use of a gas cell is well known per se in the art. It will be further appreciated that a gas cell is an optical component in which a well defined gas mixture is concealed. Accordingly, a known absorption spectrum of the gas cell may be used as a wavelength reference. This embodiment has also an advantage that the wavelength shift due to temperature fluctuations may be minimized yielding a stabilized wavelength reference unit.

It will be further appreciated that in order to incorporate a gas cell into the system (50) provision of an optical circulator (5), a collimator lens (6) a diffractive optical element (7) a displaceable mirror (8) and a motor (9) may be required. For processing light from the wavelength reference a dedicated photodiode (10) may be used. Respective outputs from the photodiodes (10) forming part of the reference circuit and the data circuit are combined at the analogue to digital converter 11.

It will be appreciated, however, that although FIG. 5 depicts a double configuration for explanation purposes, however, the number of components may be reduced by using them for both sensor read-out and Gas cell read-out. This means that the displaceable mirror, the driver motor and the diffractive element need not to be multiplied.

Figure 6:
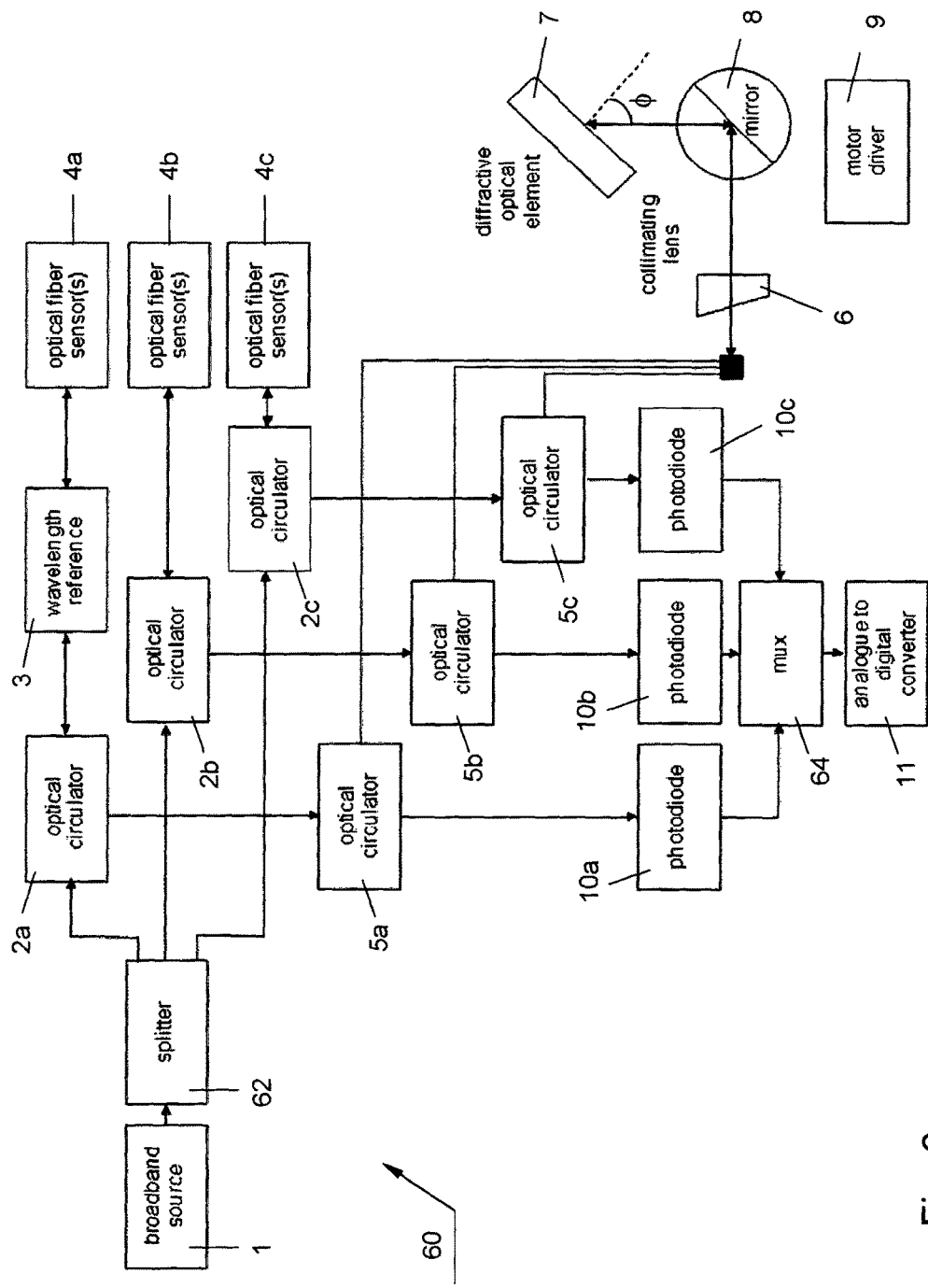
FIG. 6 presents in a schematic way a still further embodiment of an optical sensor interrogation system according to an aspect of the invention.

FIG. 6 presents in a schematic way a still further embodiment of a fiber optic sensor interrogation system according to an aspect of the invention. In the present embodiment of the system (60) according to an aspect of the invention it can be modified to increase the amount of sensors 4a, 4b, 4c, for example by providing a number of parallel data processing lines emerging after a splitter 62. Each data processing line may comprise an optical circulator 2a, 2b, 2c, wherein one of the data processing lines may comprise a wavelength reference 3. It will be appreciated that although the present embodiment schematically depicts three data processing channels, any suitable plurality of channels may be envisaged. The dimensions of the collimating lens (6), the displaceable mirror (8) and diffractive optical element (7) may be selected in such a way that they can accommodate multiple input fibers without any crosstalk between the individual fibers. In order to combine data from different channels for processing, the system (60) comprises a mixing unit 64 arranged before the analogue-to-digital converter 11.

In the foregoing specification, the invention has been described with reference to specific examples of embodiments of the invention. It will, however, be evident that various modifications and changes may be made therein without departing from the broader spirit and scope of the invention as set forth in the appended claims.

In the claims, any reference signs placed between parentheses shall not be construed as limiting the claim. The word 'comprising' does not exclude the presence of other features or steps then those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to advantage.

For example, the reference can be adapted to provide a reference wavelength in different ways, e.g. by providing light having the reference wavelength, or indirectly by providing such a reference wavelength based on a reference of the angle of the scanning assembly.

Also, for example, a wavelength reference can also be provided by a reference signal for the angle of the rotating device, e.g. using an encoder, or when the beam is incident perpendicular to the grating (angle $\phi=0$).

What is claimed is:

1. An optical sensor interrogation system for interrogating an optical sensor, the system comprising: a broadband light source and a single beam splitter, the broadband light source being arranged for emitting broadband light to the single beam splitter, wherein the single beam splitter is a single 2×2 beam splitter, wherein the single beam splitter is configured to simultaneously transmit a first beam of light through a first optical pathway, which is a reference pathway, and a second beam of light through a second optical pathway, which is a data pathway, wherein the first pathway comprises a gas cell, a first optical circulator, and a first photodiode, and the second pathway comprises a second optical circulator, a third optical circulator and a second photodiode, and wherein outputs from each of the first and second photodiodes are combined at an analog to digital converter, which is configured to generate a digital signal, and a first scanner for the first optical pathway and a second scanner for the second optical pathway, wherein the first and second scanners are configured to direct the first and second beams of light from the first and second optical circulators at different angles of incidence onto a first diffractive optical element of the first pathway and a second diffractive optical element of the second pathway, and wherein the first and second scanners are rotating mirrors.

2. The system according to claim 1, wherein the broadband light source is selected from the group consisting of a superluminescent diode (SLD), a source of amplified spontaneous emission (ASE), and a super continuum source.

3. The system according to claim 1, comprising a reference, wherein the reference, the optical sensor, or both comprise one or more Fiber Bragg gratings.

4. The system according to claim 3, wherein the reference, the optical sensor, or both comprise two Fiber Bragg gratings.

5. The system according to claim 3, wherein the reference is enclosed in an a-thermal package for stabilizing wavelength shifts.

6. The system according to claim 4, further comprising a second reference installed in the first optical pathway, after the beam splitter.

7. The system according to claim 1, wherein the first and second scanners comprise a multi-facet rotating mirror.

8. The system according to claim 7, wherein the multi-facet rotating mirror is driven by a motor causing the mirror to rotate about its central axis.

9. The system according to claim 7, wherein the multi-facet mirror is rotating with a constant speed.

10. The system according to claim 1, wherein the first and second scanners comprise rotating mirrors to direct the first and second beams at different angles of incidence onto a stationary diffraction grating, wherein the stationary diffraction grating is arranged at a pre-determined angle with respect to a direction of a light beam reflected from the mirror, wherein the pre-determined angle corresponds to the Littrow configuration.

11. The system according to claim 10, wherein the said angle is about 68.4 degrees for the center of the C-band (1530-1570 nm).

12. The system according to claim 1, comprising a diffraction grating, wherein the diffraction grating comprises at least 1200 lines per millimeter.

13. The system according to claim 12, wherein a temperature of the diffraction grating is maintained at a substantially constant value.

14. The system according to claim 12, wherein a temperature of the diffraction grating is variable, the system further comprises a temperature meter for providing data for enabling temperature correction.

15. The system according to claim 1, wherein the system comprises one or more grating elements, the system further comprising a fixed mirror arranged for measuring of both the +1 and −1 diffraction order of the grating elements.

16. The system according to claim 1, wherein the first and second scanners comprise a plurality of gratings, wherein each grating from the plurality of gratings is arranged such that each grating corresponds to a respective facet of a multi-facet mirror.

17. The system according to claim 1, comprising a reference, wherein the reference comprises at least one optically stabilized laser.

18. The system according to claim 1, comprising a reference, wherein the reference comprises the gas cell.

19. The system according to claim 1, comprising a plurality of signal analysis channels, each signal analysis channel comprising a dedicated optical fiber sensor.

20. The system according to claim 1, including a data processor arranged to calculate the wavelength of the optical sensor using at least the data of the detector, preferably at least in combination with the reference wavelength or an associated parameter such as an angle of the first and second scanners.

21. A method of interrogating an optical sensor, comprising:
providing an optical sensor interrogation system according to claim 1;
emitting the broadband light to the single beam splitter to produce the first beam of light and the second beam of light;
simultaneously transmitting the first beam of light through the first optical pathway, and the second beam of light through the second optical pathway; and
generating the digital signal from the analog to digital converter.

22. The optical sensor interrogation system according to claim 1, wherein the system comprises a fixed mirror arranged for measuring of both a +1 diffraction order and a −1 diffraction order.

23. The optical sensor interrogation system according to claim 1, wherein each of the scanners comprises a multi facet rotating element.

24. The optical sensor interrogation system of claim 1, wherein the first diffractive optical element is configured to direct light at different angles of incidence to the first optical circulator through a first collimating lens.

25. The optical sensor interrogation system of claim 24, wherein the second diffractive optical element is configured to direct light at different angles of incidence to the third optical circulator through a second collimating lens.

* * * * *

UNITED STATES PATENT AND TRADEMARK OFFICE
CERTIFICATE OF CORRECTION

PATENT NO. : 10,267,709 B2
APPLICATION NO. : 14/399489
DATED : April 23, 2019
INVENTOR(S) : Lun Kai Cheng It is certified that error appears in the above-identified patent and that said Letters Patent is hereby corrected as shown below:

On the Title Page

Column 1, Item (71), Line 1, under Applicant:, delete "Orgnisatie" and insert --Organisatie--.

Signed and Sealed this
Fifth Day of November, 2019

Andrei Iancu
*Director of the United States Patent and Trademark Office*